(12) United States Patent
McCutchen

(10) Patent No.: US 11,071,952 B2
(45) Date of Patent: Jul. 27, 2021

(54) SPINNING CROSSFLOW FILTER

(71) Applicant: VORSANA INC., Brush Prairie, WA (US)

(72) Inventor: David J. McCutchen, Portland, OR (US)

(73) Assignee: VORSANA INC., Brush Prairie, WA (US)

( * ) Notice: Subject to any disclaimer, the term of this patent is extended or adjusted under 35 U.S.C. 154(b) by 83 days.

(21) Appl. No.: 16/711,207

(22) Filed: Dec. 11, 2019

(65) Prior Publication Data

US 2020/0188855 A1    Jun. 18, 2020

Related U.S. Application Data

(60) Provisional application No. 62/778,691, filed on Dec. 12, 2018.

(51) Int. Cl.
*B01D 63/16* (2006.01)
*B01D 69/02* (2006.01)

(52) U.S. Cl.
CPC ............ *B01D 63/16* (2013.01); *B01D 69/02* (2013.01); *B01D 2313/243* (2013.01); *B01D 2325/021* (2013.01)

(58) Field of Classification Search
CPC ..... B01D 63/16; B01D 2201/36; C02F 1/385; C02F 11/127
See application file for complete search history.

(56) References Cited

U.S. PATENT DOCUMENTS

| | | | | |
|---|---|---|---|---|
| 5,073,262 A | * | 12/1991 | Ahlberg ................. | B01D 33/56 210/321.68 |
| 5,149,448 A | * | 9/1992 | Mattelmaki .......... | B01D 33/073 210/784 |
| 5,543,037 A | * | 8/1996 | Hering, Jr. ......... | B01D 24/4631 210/104 |
| 7,757,866 B2 | | 7/2010 | McCutchen | |

OTHER PUBLICATIONS

Beier, N., "Dewatering of oil sands tailings using Cross Flow Filtration," GeoEdmonton 2008, pp. 761-768.
Mikula and Omotoso, "Role of Clays in Controlling Tailings Behavior in Oil Sands Processing," Clay Science 12 Supplement 2 (2006), pp. 177-182.
Loerke, R, "Pressure and Filtration of Oil Sands Mature Fine Tailings," Univ. Alberta, 2016, 119 pages.
"Wear-Resistant Platinum Gold Alloy," Sandia National Laboratories.

(Continued)

*Primary Examiner* — Ryan B Huang
(74) *Attorney, Agent, or Firm* — Miller Nash LLP

(57) ABSTRACT

A rotatable filtration apparatus includes a partially submergible, rotatable filter in a shape of a torus having a central axis of rotation, the filter comprising an upper half and a lower half, with the lower half comprising a permeable membrane, the permeable membrane comprising at least one pore configured to pass a filtrate while excluding solids, a rotation motor configured to rotate the filter about the central axis of rotation, an anchor configured to anchor the rotatable filter in a body of liquid, and a pump to extract the filtrate from the filtrate chamber into a filtrate line.

13 Claims, 5 Drawing Sheets

(56) References Cited

OTHER PUBLICATIONS

Dinther et al., "High-flux membrane separation using fluid skimming dominated convective fluid flow," J. Membrane Science 371 (2011), pp. 20-27, Abstract only.
Syncrude—Composite Tailings, found at www.syncrude.ca/environmet/tailings-management/tailings-reclamation/composite-tails, printed Jan. 6, 2020.
International Search Report and Written Opinion, PCT/US2019/065994, Mar. 2, 2020, 11 pages.

* cited by examiner

SPINNING CROSSFLOW FILTER

RELATED APPLICATION

This application is a continuation of and claims priority to U.S. Provisional Patent Application No. 62/778,691, filed Dec. 12, 2018, which is incorporated by reference in its entirety here.

BACKGROUND

There are many examples of standing bodies of liquid contaminated with sediment and other components needing filtration. Manure lagoons, industrial waste containments, and mining tailings are among the types of filtration problems.

One pressing example of a large sediment filtration problem is the oil sands tailings ponds. Every barrel of bitumen produced by open pit mining generates up to 21 barrels of tailings (Masliyah et al., 2011: Loerke, 2016) from the water used for the oil extraction. Although recent methods have reduced this water use, it has not eliminated a large tailings stream. A portion of these tailings form a gel-like layer of Mature Fine Tailings (MFT). The MFT has 30-40% solids which is mostly kaolinite, a kind of clay which traps water. Because of this, the MFT will never settle out, and this accumulation of MFT creates a growing problem. Conventional filters include sand bed filters such as the Amiad DVF double vortex units, and the pressurized piston plate Oberlin filters, which force the water in batches through a dense filter cake, and where a 50 square foot filter surface (4.645 m$^2$) has a flow rate of up to 2,000 gallons per minute (gpm). The Orival filter system, with a flow rate of up to 12,000 gpm, forces water through a cylindrical screen, and requires a backwash cycle to clean the accumulation from the filter surface. However, the problem may be larger than even these dead-end filter approaches can handle.

According to Beier 2008: "On average, for every barrel of crude oil produced, approximately 1 m$^3$ of sand and 0.25 m$^3$ [1.57 bbl] of mature fine tailings (MFT) are produced (FTFC 1995; Mikula et al. 1996). An average 200,000 barrel per day operation can produce up to 800,000 m$^3$ of total tailings per day (Mikula and Omotoso, 2006). Tailings management practices in the last four decades have resulted in massive inventories of MFT (650 million m$^3$) requiring long-term storage within fluid containment structures (Nelson, 2006). In an effort to deal with the massive inventory of MFT and provide a stable landscape in a timely manner, the industry has moved towards the use of non-segregating tailings by implementing CT technology (Composite tailings—Syncrude, Consolidated tailings—Suncor). CT tailings are a mixture of coarse sand, gypsum (coagulant) and MFT at sand to fines ratios of approximately 4:1.

New methods of managing the tailings stream are required if the industry wants to achieve a "dry" landscape. An ideal technology would be one that could dewater the tailings stream prior to deposition. Rapid recycling of water and heat energy may be achieved through the use of dewatering technology such as Crossflow Filtration (CFF).

Crossflow filtration uses the relative motion of the liquid against the filter to achieve better filtration. The motion can be by moving the filter, or having the liquid be moving. Beier's experimental apparatus used liquid moving through a perforated pipe, and relied on the buildup of a filter cake over the filter pores, so it only achieved a maximum filtrate flux rate of 0.012 L/s/m$^2$. This is equivalent to about 2.5 teaspoons per second coming though a filter with an area of a square meter. A much faster filter flux is needed to make a successful system.

One common crossflow filtration system used in wastewater is the Hydrotech disk filter, which features a stack of partially submerged hollow filter disks in a cylindrical enclosure; the water is forced out through the slowly rotating disks while a continuous backwash cycle keeps the filter surfaces clean. However, for MFT, the residual bitumen particles in the water can be expected to gum up the filter surfaces when they are forced against them, and to resist backwashing. In addition, the rotation of the filter is so slow that the relative motion of the filter to the liquid is negligible.

Dewatering of sludge and other crossflow filtration has been previously described in Wilmot McCutchen's U.S. Pat. No. 7,757,866 "Rotary Annular Crossflow Filter, Degasser and Sludge Thickener" TriPhase Filter" which is a crossflow filter for separating liquids, solids and gases.

What is needed is a better way to dewater and treat MFT and other forms of slurry or sludge using crossflow filtration that minimizes the buildup of a filter cake.

SUMMARY

An embodiment is a rotatable filtration apparatus including at least one partially submergible, rotatable filter in a shape of a torus having a central axis of rotation, the filter comprising an upper half and a lower half, with the lower half comprising a permeable membrane, the permeable membrane comprising at least one pore configured to pass a filtrate while excluding solids, a rotation motor configured to rotate the filter about the central axis of rotation, an anchor for the rotatable filter configured to anchor the rotatable filter in a body of liquid, and a pump to extract the filtrate into a filtrate line.

LIST OF PARTS

Figure 1:
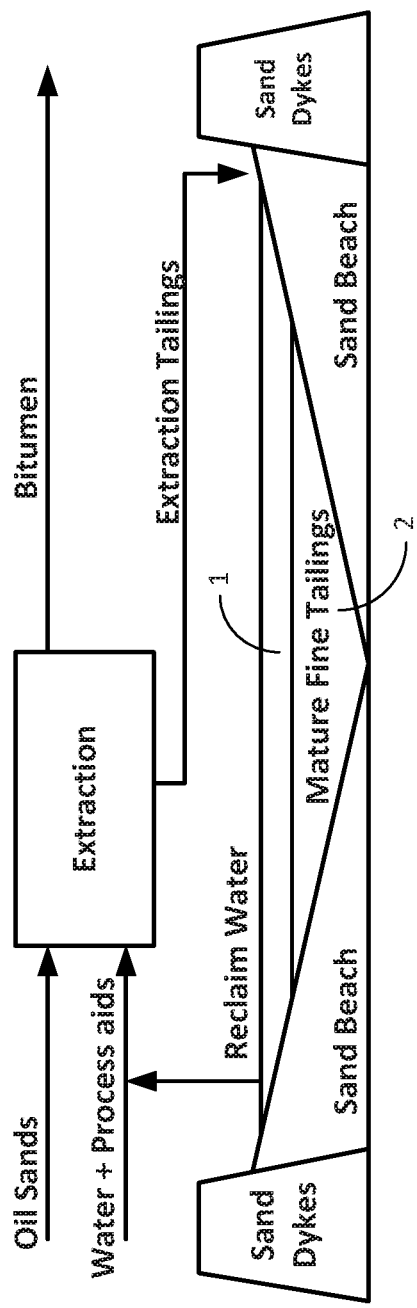
FIG. 1 is a diagram showing the prior art for oil sands tailngs ponds.

1. Surface layer of liquid
2. Mature fine tailings
3. Waste liquid pond with suspended solids
4. Torus Filter
5. Upper surface
6. Lower surface containing crossflow filter surface
7. Filter rotation
8. Filtrate in interior
9. Central filtrate sump
10. Filtrate pump
11. Rotary bearing
12. Guy wires
13. Rotation motor
14. Interior of upper half of filter 15. Vent pipe for vapors
16. Condenser
17. Condensate pump
18. Filtrate line
19. Condensate line
20. Pipeline float
21. Anchor pipe or mast
22. Power line
23. Weight
24. Central axis of rotation
25. Rejected solids
26. Spinning filter surface
27. Filter surface motion
28. Relative countermotion of liquid
29. Conical surface for pore
30. Filter pore
31. Gap in concentric ridge
32. Concentric ridge
33. Liquid flow around pore
34. Reverse ramp
35. Flow of rejected solids
36. Sheet of pores

DETAILED DISCUSSION

The embodiments here involve a new crossflow filter design that features a partially submerged rotating platform. As an example embodiment, a rotating torus, here called a Torus Filter, has a submerged filter surface in its lower half, in a spinning, leaky, partially floating platform. The relative motion of the filter surface to the surrounding fluid acts to prevent the buildup of a filter cake, setting up a liquid layer next to the filter surface. A shear lift effect works to kick the solids away from the pores, allowing the liquid filtrate to flow through more freely and continuously through the pores, collecting in the center of the Torus Filter, where it is pumped out. The upper half of the Torus Filter should be of a suitable UV-resistant material to survive long outdoor exposure. In one embodiment, part of the upper half is transparent or translucent, admitting at least some sunlight, to produce a greenhouse effect. The water vapor and hydrocarbon vapors collecting in the top half of the torus from this greenhouse heating can then be collected, condensed and pumped out as well.

To improve the filtrate flux, the embodiments involve a custom pore design that creates micro-vortices around each pore. These vortices act as mini centrifuges that help separate the solids, or condensate, from the liquid in the vortex core, which then passes as filtrate through the filter.

In one embodiment, the Torus is lightweight and preferably inflatable to improve floatation. The Torus filter can be used for dewatering a tailings pond. This torus crossflow filtration could work even in ponds where gypsum, lime or polymers have been added to aid in settling or coagulation. It can also be used for dewatering manure lagoons, ash ponds, or other liquid waste containments.

The design of a conventional oil sands tailings pond according to the prior art is shown in FIG. 1, according to Loerke 2016 citing Beier et. al. 2008. The extraction tailings in the pond 1 are differentiated over time from the denser mature fine tailings 2, forming a less dense liquid layer 1 near the surface that is easier to extract.

Figure 2:
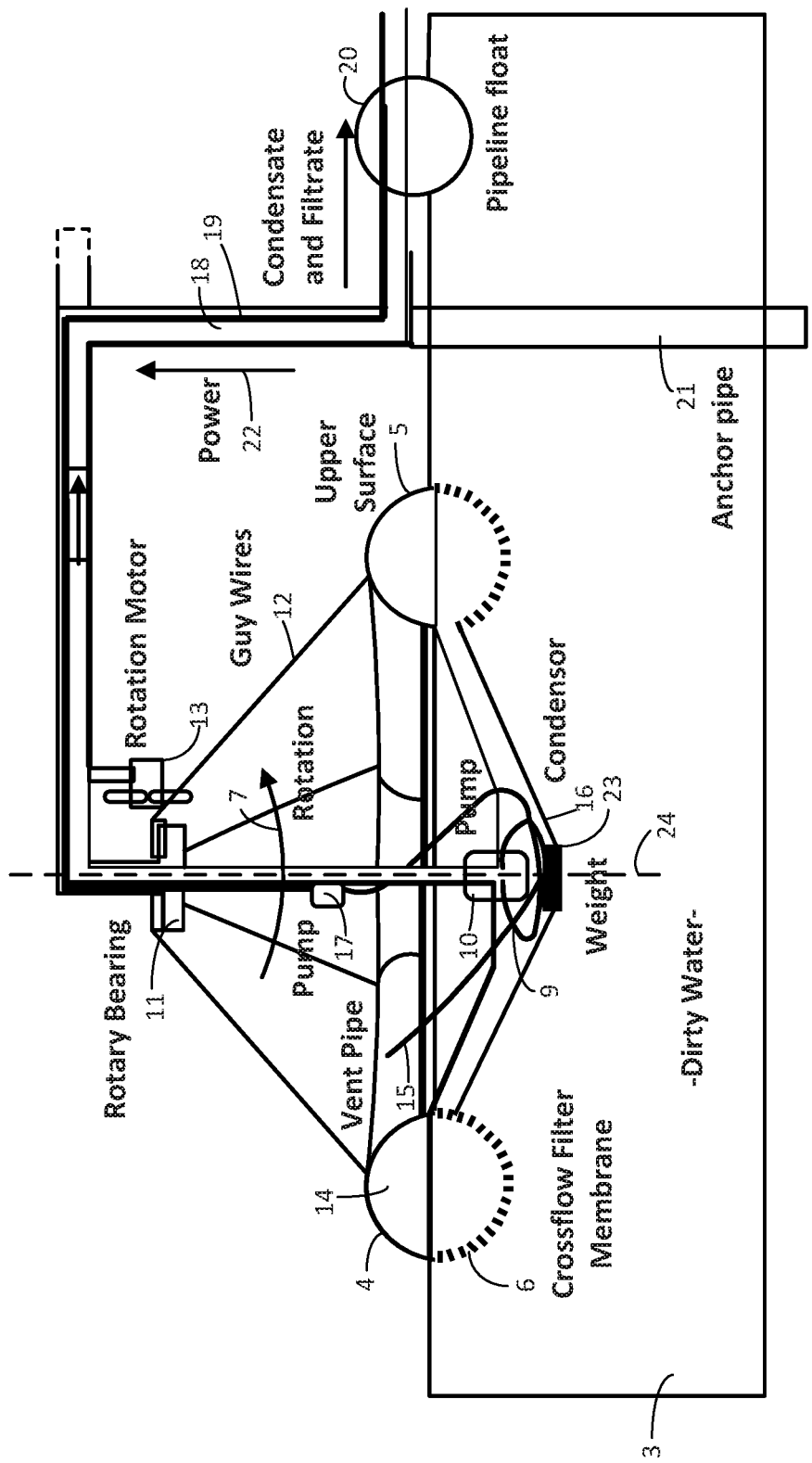
FIG. 2 is a cross section of a Torus filter design.

The apparatus described here will be called a Torus Filter. "Torus" as that used here means a closed curve, typically circular aoudna line that lies in the same plane but does not intersect it. Colloquially, it may be thought of as being donut-shaped as one example, without limitation. FIG. 2 shows a cross section of a Torus Filter 4 floating in a waste liquid pond with suspended solids 3. The shape is formed by the sweeping of a cross section about an axis of rotation. The cross section can be square, oval, boat-shaped or circular, as shown here. In the Torus Filter, the rapid motion of the spinning filter relative to the water, plus a custom pore design, creates micro-vortices around each pore to improve performance, as described in FIGS. 4-5. The Torus Filter comprises an upper surface 5 and a lower crossflow filter membrane surface 6.

As the assembly rotates according to a rotation direction 7, the filtrate leaks steadily through the crossflow filter membrane 6 and accumulates 8 in the interior, and overflows over an inner lip downward to a central collection sump 9 where a filtrate pump 10 pumps it out. The Torus Filter is supported by a central rotary bearing 11 and other structural support elements such as guy wires 12. The Torus Filter is rotated by a rotation means such as a rotation motor 13. Other rotation means could include fluid jets impinging on passing flat surfaces affixed to the outside perimeter of the Torus above the immersion line.

The upper portion 5 of the Torus Filter should be of a suitable UV-resistant material to survive long outdoor exposure. If the top half of the torus is made of transparent or translucent materials to emphasize a greenhouse heating effect, there will be more vapor and condensate produced. The vapors from the filtrate accumulated in the upper half of the Torus interior 14 exit on a vent pipe 15 to a condenser 16 such as a coil in the gathered filtrate 9 in the center, where the heat is rejected, the vapors condense, then the condensate is pumped out by a condensate pump 17. In the case of the oil sands tailings ponds, this condensate will include light hydrocarbons as well as water.

The filtrate line 18 and the condensate line 19 are supported by structural supports which can include an anchor mast or pipe 21 affixed to the bed of the pond, and which carry other support lines such as communications and power lines 22. The pipeline of the filtrate and condensate line may have a pipeline float 20 to allow the pipe to reach solid ground from the pool of liquid with mixed solids within which the filter operates. A weight 23 can help form the collection sump. The central axis of rotation is shown at 24.

An example two meter diameter Torus Filter with a 60 cm diameter tube, would have a filter surface of over 16 square meters, and at a rotation speed of 200 RPM the outer surface of the filter would be moving at 75.4 KPH (46.85 MPH) relative to the water. At a rate of 500 L/m$^2$/h, the filtrate flow would be 8,000 L/h (35.2 gallons/m; 1,206.8 bpd). A group of spinning Toruses can be anchored to a single mast. Their location around the mast can be arranged as needed, such as by making a dense cluster, or a more open arrangement. The locations can also be determined by a floating central boat or raft, with radiating support masts for holding several rotating filters in position. Alternately, propellers in the pond or water jets could hold the spinning filter in position.

Figure 3:
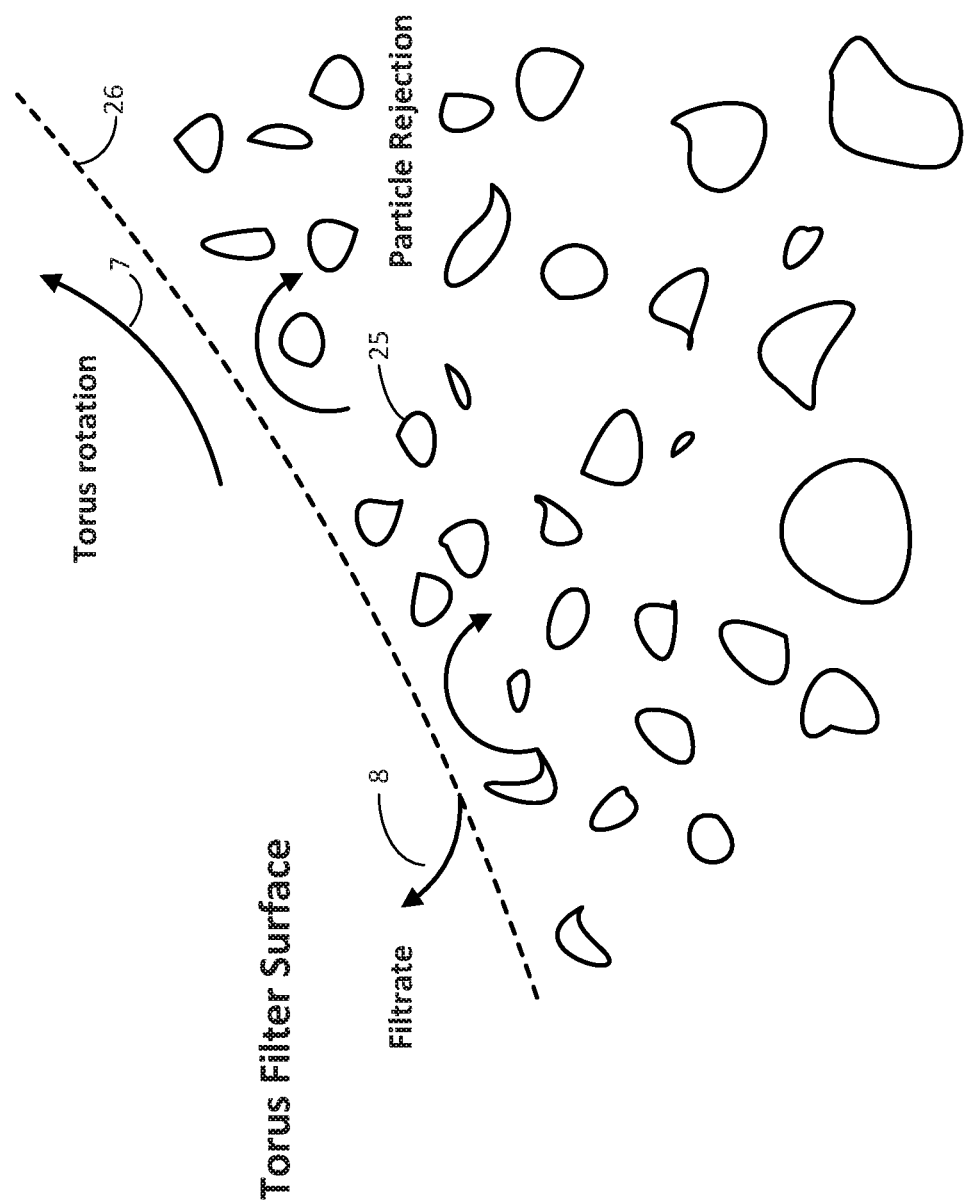
FIG. 3 is a closeup showing the rejection of solids from a spinning filter surface.

FIG. 3 shows the rejection of solids 25 from the spinning filter surface 26. Solid particles will tend to be rejected from a spinning surface due to the shear lift effect, while the filtrate passes through the filter pores to the interior 8. The filter surface 26 should be made of a corrosion-resistant and wear-resistant material, especially for abrasive fluids such as tailings ponds and ash ponds, to prevent the filter from wearing out. One preferred coating for the filter is the wear-resistant platinum-gold alloy recently developed by Sandia National Laboratory. Other wear-resistant coatings are available from companies such as General Magnaplate and St. Gobain. Sapphire coatings and tough ceramic composite material for the filter can also be used.

Figure 5:
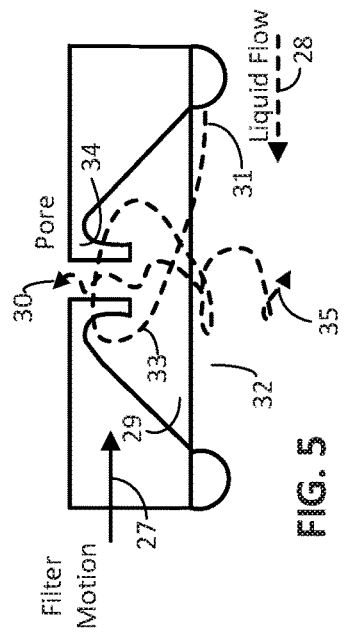
FIG. 5 shows a design for the pores as miniature hydrocyclones.
Figure 4:
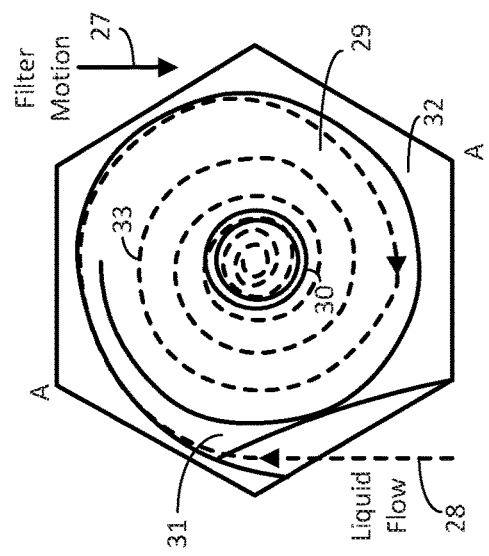
FIG. 4 shows a conical filter for rejection of solids from the filtrate.

FIG. 4 and FIG. 5 shows a conical pore design, with FIG. 5 being a cross section along the line A-A. Van Dinther et al's "High-flux membrane separation using fluid skimming dominated convective fluid flow," shows that circular or conical pores in a crossflow filter can lead to solid particles being rejected even from pores that are up to five times larger. Larger pores will mean larger filtrate flux, especially because the pores are not, like conventional filters, being clogged by an accumulating filter cake. This design here makes the pores act as mini centrifuges that help separate the solids from the water in the vortex core, which then passes through the filter pore. The motion of the filter 27 creates a relative countermotion of liquid 28 in the opposite direction, which flows across the conical surface 29 surrounding the filter pore 30. A gap 31 in a concentric ridge 32 surrounding the cone allows in a liquid flow 33 around the pore, creating a vortex flow moving down the cone, preferably with a reverse ramp 34 at the bottom to accelerate the flow of rejected solids 35 downward, while the upward flow through the pore draws the cleaner filtrate in the vortex core downward through the pore 30. The reversal of direction of these two streams helps to separate the filtrate from the ejected solids.

Figure 6:
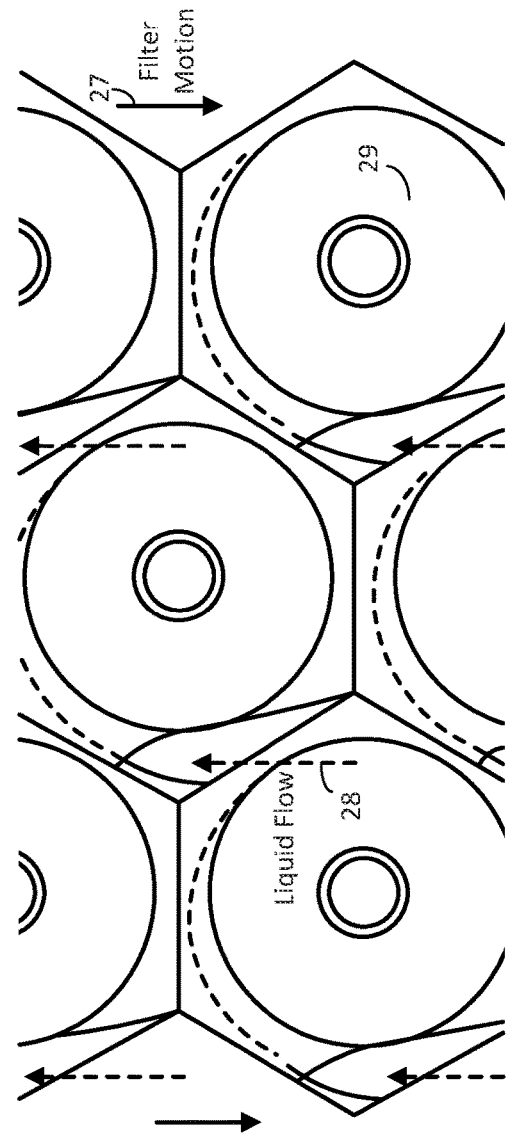
FIG. 6 shows a sheet of an embodiment of a conical filter.

FIG. 6 shows a sheet of such conical filters, showing the filter motion 27, the relative fluid motion 28 and a conical filter surface 29.

Figure 7:
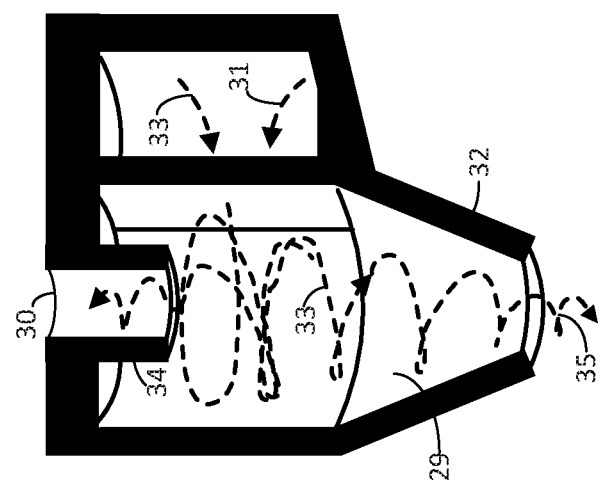
FIG. 7 shows an embodiment of a pore design.

FIG. 7 shows a pore design with the pores as miniature cyclones, with feed chutes 31 to the side of each, the main pore 30 at the top and the sediment rejection outlet 35 at the bottom. The conical surface 29 in this case is at the bottom, and a reverse ramp 34 is at the top surrounding the pore. A sheet of these could be manufactured most efficiently through 3D printing techniques.

Figure 8:
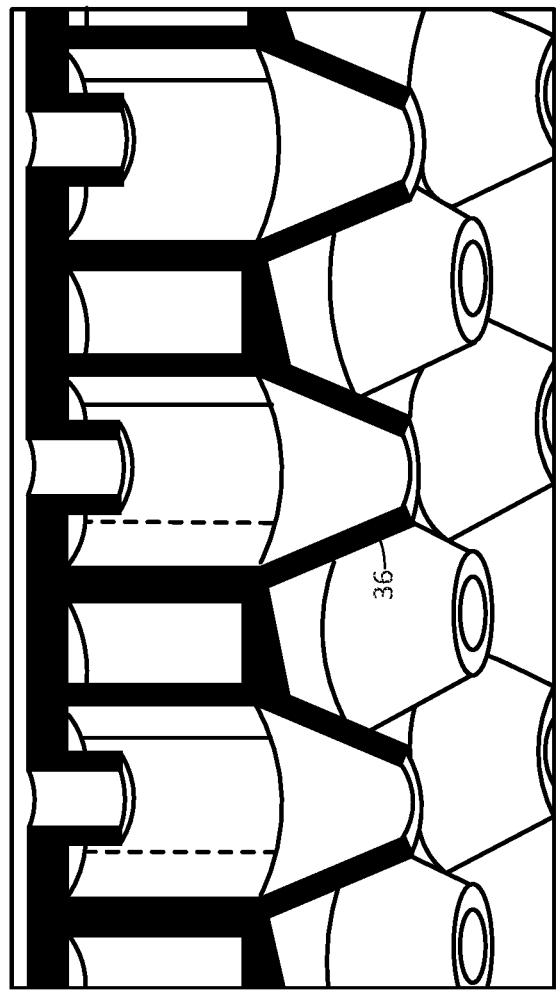
FIG. 8 shows an array of pores.

FIG. 8 shows an array of pores such as the miniature cyclones of FIG. 7, although they could take other forms. The array of pores could be formed as one continuous sheet of pores 36 to make up the permeable membrane.

Manufacturing techniques such as additive 3D printing, together with subtractive techniques such as laser shaping for the pores, can be used to produce the filter surface. The filter surface sheets should be shaped to match the torus shape, and installed in a replaceable fashion to a supporting internal framework. Generally the outside filter surface should be smooth and uninterrupted, to make a laminar flow over the filter surface. The micro-vortices carrying the rejected solids into this laminar flow will be angled because of the motion of the filter surface.

This custom pore design can also be used in other crossflow filters, including the applicant's "Biconical Mutiphase Rotary Filter" Ser. No. 15/613,734. The shape of the spinning filter platform can also be conical or a set of hollow concentric shapes.

While the embodiments of the present invention have been particularly shown and described above, it will be understood by one of ordinary skill in the art that various changes in form and details may be made therein without departing from the spirit and scope of the present invention as defined by the following claims.

The invention claimed is:

1. A rotatable filtration apparatus comprising:
   at least one partially submergible, rotatable filter in a shape of a torus having a central axis of rotation, the at least one rotatable filter comprising an upper half and a lower half, with the lower half comprising a permeable membrane;
   the permeable membrane comprising at least one pore configured to pass a filtrate while excluding solids;
   a rotation motor configured to rotate the at least one rotatable filter about the central axis of rotation;
   an anchor for the at least one rotatable filter configured to anchor the at least one rotatable filter in a body of liquid; and
   a pump to extract the filtrate into a filtrate line.

2. The apparatus as claimed in claim 1, further comprising a condensate chamber configured to collect condensate forming on an inner surface of the upper half of the rotatable filter apparatus, and a condensate pump configured to extract the condensate into a condensate line.

3. The apparatus as claimed in claim 1, wherein the permeable membrane is coated by an alloy of gold and platinum.

4. The apparatus as claimed in claim 1, wherein the at least one pore has a conical shape and a gap in a concentric ridge around the at least one pore configured to create a vortex flow.

5. The apparatus as claimed in claim 4, wherein the at least one pore has a reverse ramp at one end of the at least one pore and a sediment rejection outlet at an opposite end.

6. The apparatus as claimed in claim 1, wherein the at least one pore comprises an array of pores formed into a sheet to form the permeable membrane.

7. The apparatus as claimed in claim 1, wherein an outside surface of the at least one rotatable filter is smooth.

8. The apparatus as claimed in claim 1, wherein the top half of the at least one rotatable filter is at least translucent.

9. The apparatus as claimed in claim 8, further comprising a vent pipe connected to the upper half of the at least one rotatable filter to remove vapors.

10. The apparatus as claimed in claim 1, wherein the at least one rotatable filter is inflatable.

11. The apparatus as claimed in claim 1, further comprising a float to float the filtrate line across a surface of the body of liquid from which the filtrate is being extracted.

12. The apparatus as claimed in claim 2, further comprising a float to float the condensate line across a surface of the body of liquid from which the condensate is being extracted.

13. The apparatus as claimed in claim 1, wherein the at least one rotatable filter comprises multiple rotatable filters centered around the central axis of rotation.

* * * * *